(12) United States Patent
Guo et al.

(10) Patent No.: US 8,593,803 B2
(45) Date of Patent: Nov. 26, 2013

(54) MOUNTING APPARATUS FOR DATA STORAGE DEVICE

(75) Inventors: Xue-Jiao Guo, Shenzhen (CN); Tai-Bao Wu, Shenzhen (CN); Shu-Qiu Wang, Shenzhen (CN); Li-Fu Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 263 days.

(21) Appl. No.: 13/176,380

(22) Filed: Jul. 5, 2011

(65) Prior Publication Data
US 2012/0155012 A1 Jun. 21, 2012

(30) Foreign Application Priority Data
Dec. 20, 2010 (CN) .......................... 2010 1 0596258

(51) Int. Cl.
*H05K 7/00* (2006.01)
(52) U.S. Cl.
USPC ............ 361/679.39; 361/679.31; 361/679.33; 361/679.34; 174/138 E; 174/138 G
(58) Field of Classification Search
USPC ............ 361/379.31, 379.33, 379.39, 379.36, 361/379.34, 379.35, 679.31, 679.33, 361/679.39, 679.36, 679.34, 679.35; 16/2.4, 2.5; 439/2, 377; 248/635, 632, 248/694; 174/138 E, 138 G
See application file for complete search history.

(56) References Cited

U.S. PATENT DOCUMENTS

| | | | |
|---|---|---|---|
| 6,627,811 B2 * | 9/2003 | Rubenstein et al. | 174/376 |
| 6,819,556 B2 * | 11/2004 | Chen et al. | 361/679.34 |
| 6,917,520 B2 * | 7/2005 | Lin et al. | 361/679.35 |
| 7,889,491 B2 * | 2/2011 | Chiang et al. | 361/679.34 |
| 7,926,780 B2 * | 4/2011 | Yeh et al. | 248/632 |
| 7,954,784 B2 * | 6/2011 | Yeh et al. | 248/635 |
| 8,432,680 B2 * | 4/2013 | Peng et al. | 361/679.36 |
| 2004/0194333 A1 * | 10/2004 | Allen | 33/638 |
| 2006/0227502 A1 * | 10/2006 | Cheng | 361/685 |

* cited by examiner

*Primary Examiner* — Hoa C Nguyen
*Assistant Examiner* — Christopher L Augustin
(74) *Attorney, Agent, or Firm* — Altis & Wispro Law Group, Inc.

(57) ABSTRACT

A mounting apparatus for mounting a data storage device, includes a drive bracket and a slider mounted on the data storage device. The drive bracket includes a side piece in which a sliding groove is located. The sliding groove includes a first end and a second end. The second end is adjacent to an edge of the side piece. The first end is located on the side piece. A guiding surface is located at the first end. The guiding surface inclines from an inner surface of the side piece to an outer surface of the side piece. The slider slides in the sliding groove from the second end to the first end. The slider abuts the guiding surface. The guiding surface retains the slider at the first end.

19 Claims, 4 Drawing Sheets

MOUNTING APPARATUS FOR DATA STORAGE DEVICE

BACKGROUND

1. Technical Field

The present disclosure relates to mounting apparatus, and more particularly to a mounting apparatus for a data storage device.

2. Description of Related Art

In a conventional server or computer system, a plurality of devices, such as data storage devices, are mounted within an enclosure. Screws usually mount these data storage devices to the enclosure. However, the screws often may loosened when the server of the computer system is shook during transit. That may cause the data storage devices to deviate from its original position.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
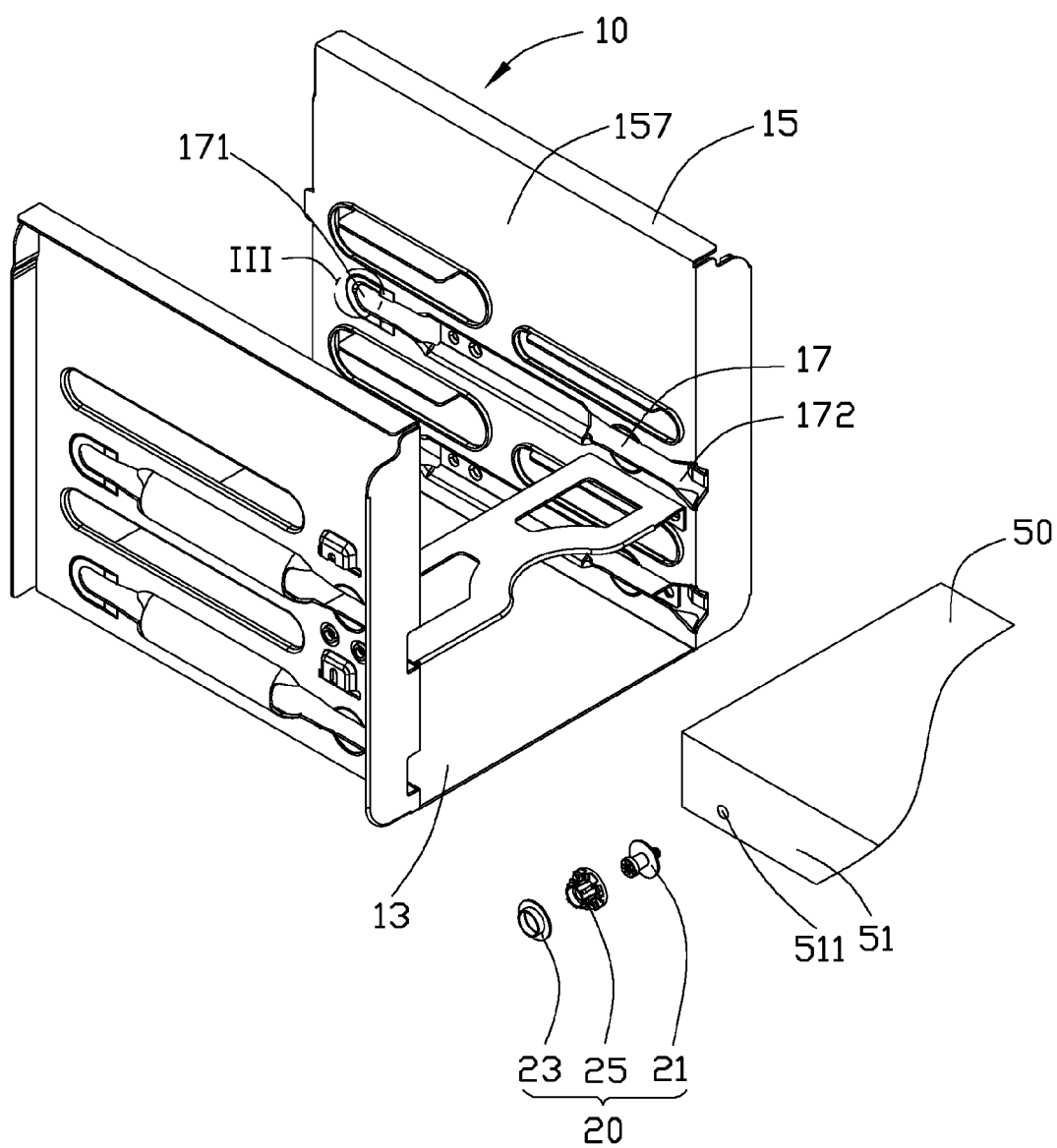
FIG. 1 is an isometric and exploded view of an embodiment of a mounting apparatus for a data storage device.

Referring to FIG. 1, a mounting apparatus for mounting a data storage device 50 in accordance with an embodiment includes a drive bracket 10. The data storage device 50 includes a pair of side walls 51. Each side wall 51 defines a mounting hole 511 therein. The mounting apparatus further includes two sliders 20 which are mounted in the mounting holes 511.

Figure 2:
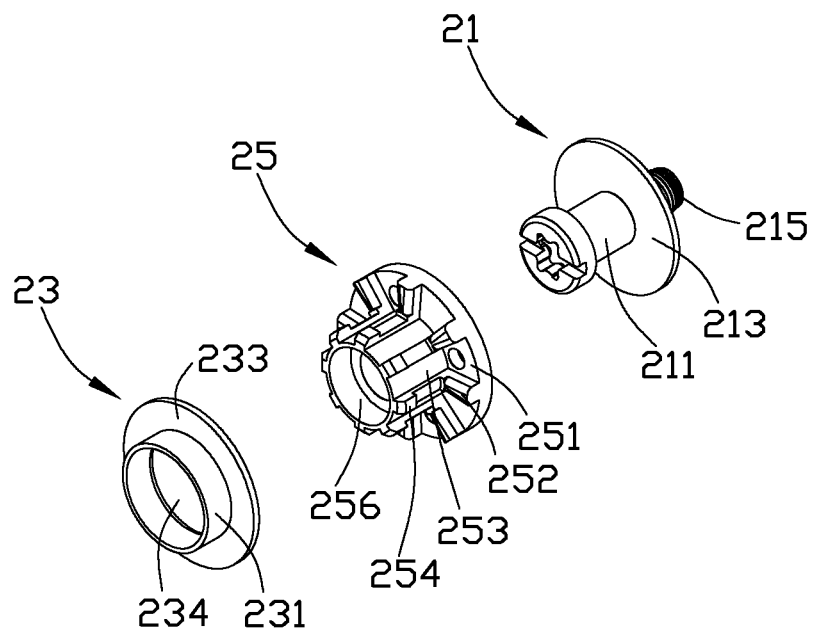
FIG. 2 is an isometric and exploded view of a slider of the mounting apparatus of FIG. 1.

Referring to FIGS. 1 and 2, each slider 20 includes a screw 21, a sleeve 23, and a spring gasket 25. The screw 21 includes a pole portion 211. A supporting piece 213 is mounted on the pole portion 211. A distal end of the pole portion 211 is a fixing end 215, which defines a plurality of screw threads. The sleeve 23 includes a restricting ring 231 and a skirting piece 233. The skirting piece 233 is connected to a side of the restricting ring 231. A first through hole 234 is surrounded by the restricting ring 231.

The spring gasket 25 is made of elastic and shock absorbing material, such as rubber, or foam. The spring gasket 25 includes a base 251 and a connection portion 253 connected to the base 251. A plurality of ribs 252 is formed on the base 251. A plurality of blocks 254 is formed on the connection portion 253. The spring gasket 25 defines a second through hole 256, which extends through the connection portion 253 and the base 251. An external diameter of the connection portion 253 is slightly larger than a diameter of the first through hole 234.

Figure 3:
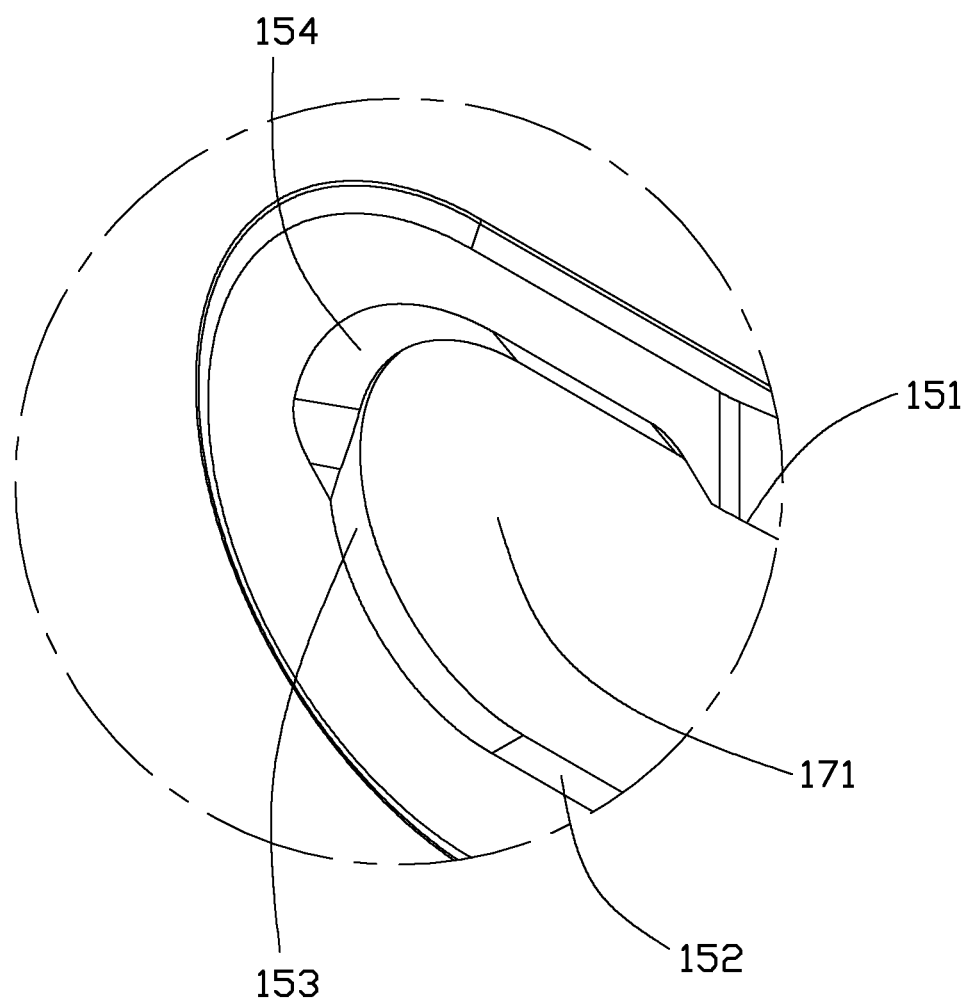
FIG. 3 is an enlarged view of the circle III of FIG. 1.
Figure 4:
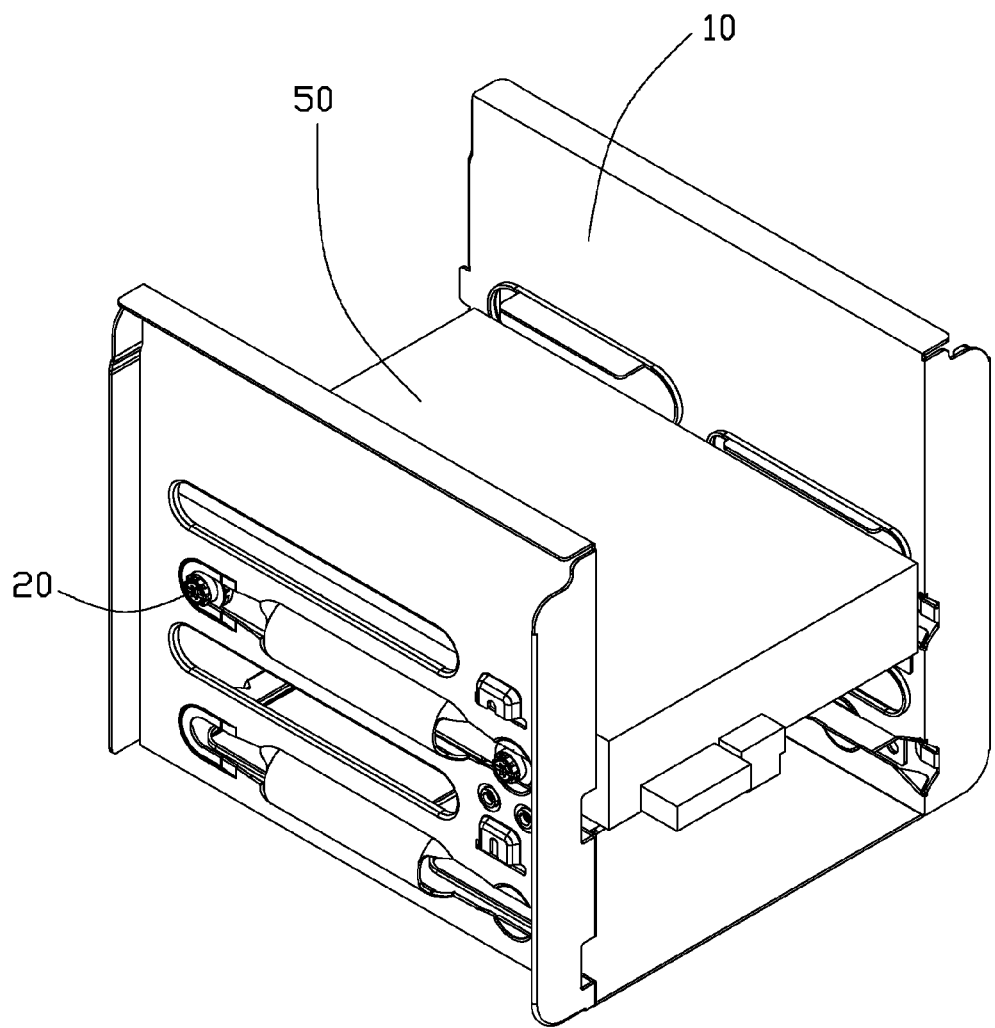
FIG. 4 is an isometric and assembled view of the mounting apparatus of FIG. 1.

Referring to FIGS. 1 and 3, the drive bracket 10 includes a bottom piece 13 and a pair of side pieces 15 perpendicularly connected to opposite edges of the bottom piece 13. Each side piece 15 includes an inner surface 157 which faces the other side piece 15. A pair of sliding grooves 17 is defined in the pair of side pieces 15. Each sliding groove 17 includes a first end 171 and a second end 172. The second end 172 extends to an edge of the side piece 15. The first end 171 is located in the side piece 15. The first end 171 includes a first end surface 151, a second end surface 152, and a third end surface 153. The first end surface 151 and the second end surface 152 are substantially parallel to each other. The third end surface 153 is arc-shaped and connected to the first end surface 151 and the second end surface 152. The first end surface 151, the second end surface 152, and the third end surface 153 together surround the first end 171. A slope guiding surface 154 is located on the third end surface 153. The slope guiding surface 154 inclines from the inner surface 157 to an outer surface of the side piece 15.

Referring to FIGS. 1 to 4, in assembly, the pole portion 211 of the screw 21 is inserted in the second through hole 256 of the spring gasket 25. The base 251 of the spring gasket 25 is placed on the supporting piece 213 of the screw 21. Then, the connection portion 253 of the base 251 is inserted in the first through hole 234. The connection portion 253 is pressed by the restricting ring 231 to be elastically deformed. The connection portion 253 is inserted in the first through hole 234 until the block 254 is moved out of the first through hole 234. The block 254 rebounds to abut an edge of the restricting ring 231. Therefore, the sleeve 23 is secured on the spring gasket 25. In this position, the skirting piece 233 abuts the ribs 252 of the spring gasket 25. In succession, the fixing end 215 is secured in mounting hole 511 to mount the slider 20 on the mounting hole 511 of the data storage device 50.

The slider 20 then slides in the sliding groove 17 from the second end 172 to the first end 171. The restricting ring 231 is located on second end surface 152 of the first end 171. The restricting ring 231 also abuts the third end surface 153 of the first end 171. Then, the data storage device 50 is secured on the drive bracket 10 in this position by some conventional manner, such as locking.

When the drive bracket 10 on the data storage device 50 are shook in transit, the spring gasket 25 can absorb the shocks well. Further, the sloped guiding surface 154 can guide the slider 20 back to its original position when the drive bracket 10 is shook.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for mounting a data storage device, comprising:
a drive bracket comprising a side piece; a sliding groove, located in the side piece, comprising a first end and a second end, and the second end is adjacent to an edge of the side piece, and the first end located in the side piece, a guiding surface located on the first end, the guiding surface inclined from an inner surface of the side piece to an outer surface of the side piece; and a slider comprising a screw, a spring gasket, and a sleeve; the screw mounted on the data storage device and comprising a supporting piece, the spring gasket surrounding the screw and comprising a base, the sleeve surrounding the spring gasket and comprising a skirting piece, and the base abuts the skirting piece and is located between the skirting piece and the supporting piece, wherein the sleeve is engaged in the sliding groove and slidable from the second end to the first end, the screw abuts the guiding surface, and the guiding surface is adapted to retain the slider at the first end.

2. The mounting apparatus of claim 1, wherein the first end comprises a first end surface, a second end surface, and a third end surface; the first end surface and the second end surface are generally parallel to each other, and the third end surface is arc-shaped and connected to the first end surface and the second end surface; and the guiding surface is located on the third end surface.

3. The mounting apparatus of claim 2, wherein the first end surface, the second end surface, and the third end surface together surround the first end.

4. The mounting apparatus of claim 1, wherein the spring gasket further comprises a connecting portion connected to the base, and the sleeve further comprises a restricting ring connected to the skirting piece, a first through hole is located in the restricting ring and the skirting piece, and the connecting portion is inserted in the first through hole.

5. The mounting apparatus of claim 1, wherein the sleeve is slidable on an edge of the sliding groove.

6. The mounting apparatus of claim 4, wherein the base comprises a plurality of ribs, and the skirting piece abuts the plurality of ribs.

7. The mounting apparatus of claim 6, wherein the spring gasket is made of elastic and shock absorbing material, the connection portion comprises a plurality of blocks, the plurality of blocks abuts an edge of the restricting ring, opposite to the skirting piece.

8. The mounting apparatus of claim 6, wherein a second through hole is located in the connecting portion and the base, the screw further comprises a pole portion connected to the supporting piece, and the pole portion is mounted in the second through hole.

9. The mounting apparatus of claim 8, wherein an external diameter of the connection portion is slightly larger than a diameter of the first through hole, an external diameter of the base is larger than the diameter of the first through hole.

10. The mounting apparatus of claim 9, wherein a distal end of the pole portion is a fixing end, the fixing end comprises a plurality of screw threads, and the fixing end is secured on the data storage device.

11. A mounting apparatus for mounting a data storage device, comprising:

a drive bracket comprising a side piece; a sliding groove located in the side piece; and a slider mounted on the data storage device, the slider comprising a screw, a spring gasket and a sleeve, the screw comprising a supporting piece, the sleeve comprising a restricting ring and a skirting piece connected to a side of the restricting ring, a first through hole located in the restricting ring and the skirting piece; the spring gasket comprising a base and a connection portion connected to the base, the base comprising a plurality of ribs; wherein the connection portion is inserted in the first through hole and surrounds the screw, the base is located between the skirting piece and the supporting piece, and the skirting piece abuts the plurality of ribs; the sleeve is slidably engaged on an edge of the sliding groove, and the spring gasket is adapted to absorb shocks.

12. The mounting apparatus of claim 11, wherein the sliding groove comprises a first end and a second end, the second end is adjacent to an edge of the side piece, and the first end is located in the side piece; a guiding surface is located at the first end, the guiding surface inclines from an inner surface of the side piece to an outer surface of the side piece; the slider is adapted to slide in the sliding groove from the second end to the first end, the slider abuts the first end, and the guiding surface is adapted to retain the slider at the first end.

13. The mounting apparatus of claim 12, wherein the first end comprises a first end surface, a second end surface, and a third end surface; the first end surface and the second end surface are generally parallel to each other, and the third end surface is arc-shaped and connected to the first end surface and the second end surface; and the guiding surface is located on the third end surface.

14. The mounting apparatus of claim 13, wherein the first end surface, the second end surface, and the third end surface together surround the first end.

15. The mounting apparatus of claim 11, wherein the spring gasket is made of elastic and shock absorbing material, the connection portion comprises a plurality of blocks, the plurality of blocks abuts an edge of the restricting ring.

16. The mounting apparatus of claim 11, wherein the spring gasket comprises a second through hole, and a screw is mounted in the second through hole.

17. The mounting apparatus of claim 16, wherein the screw includes a pole portion connected to the supporting piece, the pole portion is located in the second through hole.

18. The mounting apparatus of claim 17, wherein a distal end of the pole portion is a fixing end, the fixing end comprises a plurality of screw threads, and the fixing end is secured on the data storage device.

19. The mounting apparatus of claim 11, wherein an external diameter of the connection portion is slightly larger than a diameter of the first through hole, an external diameter of the base is larger than the diameter of the first through hole.

* * * * *